May 17, 1932. J. E. POINTON 1,858,937
BAKING OVEN
Filed Feb. 27, 1929 2 Sheets-Sheet 1

J. E. Pointon
INVENTOR

By Marks&Clerk
ATTYS.

UNITED STATES PATENT OFFICE

JOHN EDWARD POINTON, OF PETERBOROUGH, ENGLAND, ASSIGNOR TO BAKER PERKINS COMPANY INCORPORATED, OF NEW YORK, N. Y.

BAKING OVEN.

Application filed February 27, 1929, Serial No. 343,187, and in Great Britain March 22, 1928.

This invention relates to baking ovens, of the type wherein the loaves of bread or the confectionery or other goods to be baked, (all of which are hereinafter included in the term loaves), are carried on a continuous conveyor in a circuitous course through the oven or baking chamber and pass during such transit between heating elements adapted to impart top and bottom heat to the loaves on said conveyor. For such heating elements the well known closed steam pipes or tubes generally known as Perkins tubes have been employed; also gas burners extending across the oven with or without an inclosing tube for each burner or row of burners.

It is also known to locate a series of burner tubes between top and bottom slabs of refractory material, and it has been proposed to mount burner tubes (extending across and located at intervals throughout an oven) in metal channel members covered by metal slabs, slotted or otherwise, and adapted to act as heat accumulators by the impingement of the burner jets upon the metal with a view to affording "solid heat". In all these cases it has been the practice or intention to distribute or arrange for the dispersal of the source of heat more or less uniformly over the oven area.

The object of this invention is to provide, while employing fewer heat sources, a very effective baking heat with economy in construction and oven maintenance and fuel consumption.

The invention consists in the provision of a localized and concentrated heat source enclosed within a tortuous chamber or passage formed in refractory material of great heat storage capacity and arranged so that the bulk of the intense heat developed is communicated to and stored in the refractory material to afford a "solid heat" zone.

Normally a plurality of heat storage elements as specified in the preceding paragraph are employed and the combustion gases from the several heat sources are confined in their transit through the tortuous passages or chambers and thereafter led into flues.

By a "localized and concentrated heat source" is meant a burner device for oil or gaseous fuel adapted to develop an intense heat in a comparatively small region or area in contradistinction to heating arrangements extending across and distributed at comparatively close intervals throughout an oven.

In the accompanying sheets of explanatory drawings:—

Figure 1:
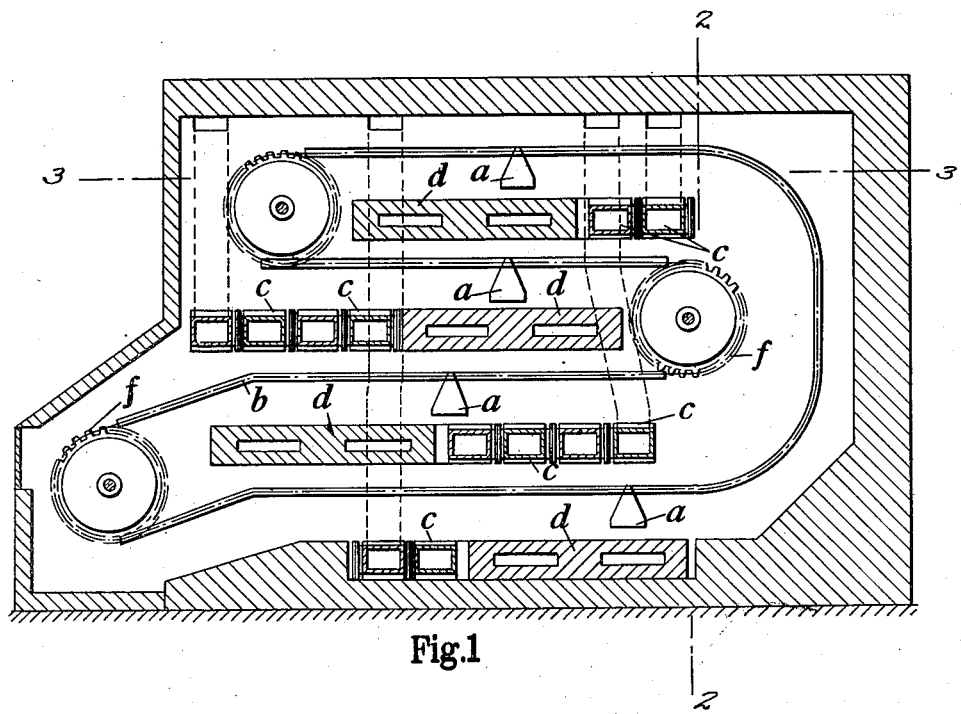
Fig. 1 is a sectional elevation of a baking oven according to the invention and taken on the line 1—1 of Fig. 3.
Figure 2:
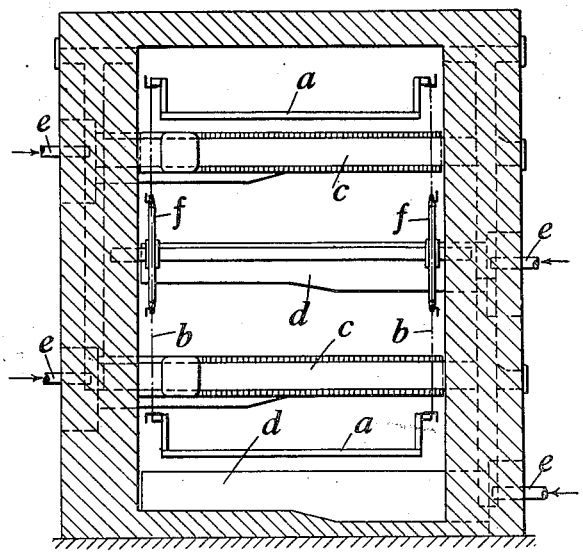
Fig. 2 is a cross section of the oven taken on the line 2—2 of Fig. 1.
Figure 3:
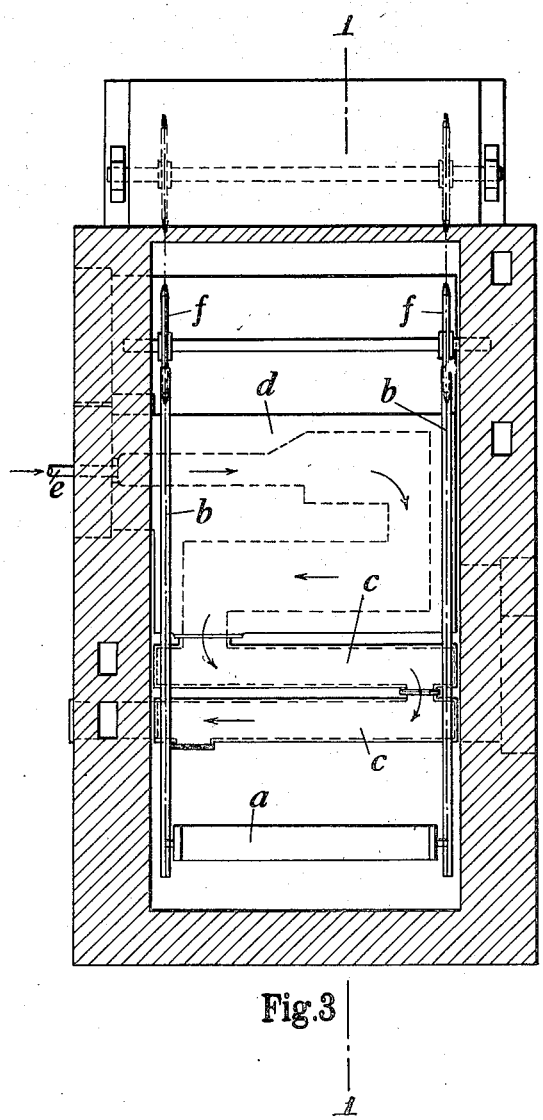
Fig. 3 is a sectional plan of the oven taken on the line 3—3 of Fig. 1.

In carrying the invention into effect as shown, in the construction of an oven of the type having trays $a$ depending or swinging from a continuous conveyor $b$ moving in a circuitous course through the baking chamber, there are arranged between the straight runs or lengths of the conveyor, heating elements $d$, $c$ of refractory material preferably extending across from side to side of the baking chamber or interior of the oven and of a combined longitudinal extent equal to or approximating that of the said straight runs. The heating element below the lowest run may be located in the masonry of the oven as seen in Figure 1. The said elements are hollow or have chambers or passages therein lying in one plane and so arranged that the products of the combustion within such chambers of the oil or gaseous fuel and necessary air admitted thereto, are caused to take a circuitous course (as indicated in Figure 3) in order that the refractory material from which such elements are constructed shall effectually absorb heat from such products before they are discharged. The fuel burners are indicated by $e$, affording a localized intense source of heat at or towards the entrance end of the chamber or passage in the refractory element $d$, and the course of the gases is indicated by arrows in Figure 3 which also shows a restricted passage area adjacent the flame zone. The drawings show two different forms of baking elements. Those marked $d$ consist of broad hollow slabs of refractory material affording great heat storage capacity, and those marked $c$ consist of straight tubes of rectangular cross section and of lesser heat storage capacity which receive the gases as they leave the blocks $d$ at decreased temperature and lead them to flues. It is convenient to employ a combination of parts as shown, but if desired the elements may be all of the same kind, that is to say, all like $d$.

The heating elements may be arranged so that the elements $d$ in one layer are opposite the elements $c$ in another or adjacent layer.

The exteriors of the baking elements constitute the walls of the tunnels or passages for the conveyor with the swinging trays and the loaves therein, and such baking elements formed of refractory material which has absorbed heat from the combustion within them, constitute continuous heat radiating surfaces which provide what is known in the baking trade as a region of solid baking heat, as distinguished from flash or spot heat such as is obtained from burners or heating elements disposed at intervals throughout the baking chamber. Such solid baking heat is akin to that obtained from an oven of the stone sole or retort type in which the baking heat is afforded by radiation from the previously heated floor, side and end walls and roof of the oven. By this invention there is obtained the recognized advantages of such solid baking heat with the continuous operation of the oven on baking service and the expedition and economy associated with the use of a travelling conveyor whereby the loaves are automatically passed into and out of the oven. The invention further ensures economy in the construction and maintenance of the oven.

The baking elements may be adapted to extend throughout the curved portions of the conveyor, or where the latter pass round the guide wheels $f$ or the like, and other modifications may be made in the application of the invention to meet varying services or requirements.

Whilst the invention has been exemplified by its application to ovens of the kind in which a continuous conveyor passes through the oven or baking chamber in a circuitous course, the invention is not limited to ovens of this kind but is applicable to other ovens such as, for example, straight tunnel ovens.

Having thus described my invention what I claim as new and desire to secure by Letters Patent is:—

1. A baking oven wherein the goods are carried on a continuous conveyor through the oven and pass between independent heating elements adapted to impart top and bottom heat to the goods, each element comprising a section formed of refractory material of great heat storage capacity and a section formed of material having less heat storage capacity, said sections enclosing a tortuous chamber enclosing a localized and concentrated heat source, whereby the bulk of the heat developed is communicated to the refractory material section of the element to afford a plurality of "solid heat" zones.

2. A baking oven as claimed in claim 1, wherein the elements are located between the laps of a conveyer, the great heat storage section of each element lying opposite to a less heat storage section of an adjacent element.

In testimony whereof I have signed my name to this specification.

JOHN EDWARD POINTON.